United States Patent Office 2,917,245
Patented Dec. 15, 1959

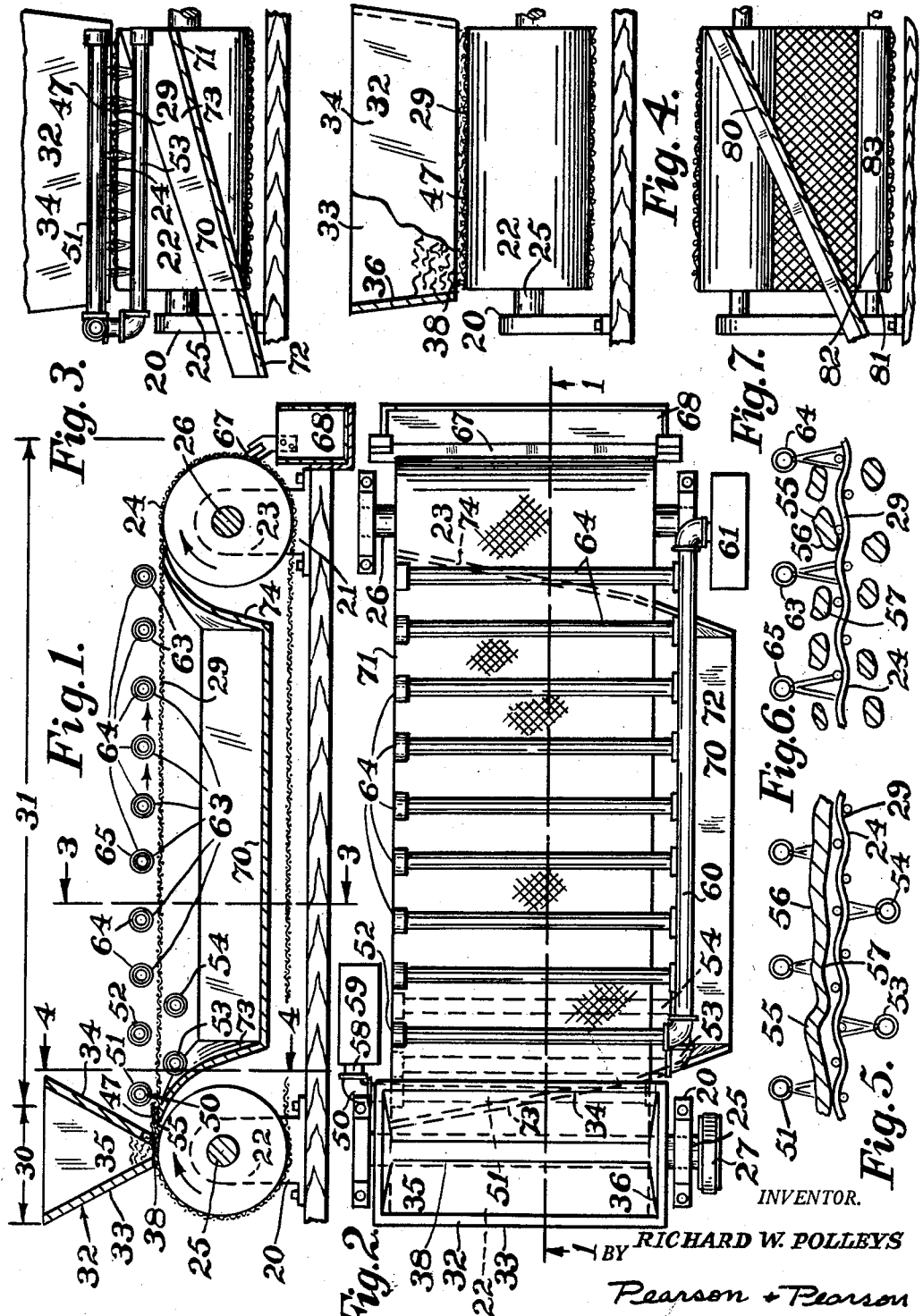

2,917,245

PULPING APPARATUS AND METHOD

Richard W. Polleys, North Andover, Mass., assignor to John W. Bolton & Sons, Inc., Lawrence, Mass., a corporation of Massachusetts Application April 24, 1957, Serial No. 654,690

9 Claims. (Cl. 241—15)

This invention relates to an apparatus and method for continuously converting dry waste paper and the like into pulp. Such waste paper is an important source of raw material in the making of paper and the paper fibers therein must be separated into the same general condition as they were in when originally deposited on the wire of a Fourdrinier or other paper machine.

In the prior art machines and methods for pulping such paper, de-inking such paper and both pulping and de-inking such paper have been proposed but this invention relates only to pulping and the de-inking thereof forms no part of the invention. The use of rotary impellers in a tank for defibring waste paper has a tendency to shorten the fibers. Inasmuch as the fibers in waste paper have already passed through one or more refining processes, it is disadvantageous to shorten them any further in a second paper making process.

The principal object of this invention is to convert dry waste paper into pulp ready for refining, beating or even application to a paper making screen without shortening the fibers unduly or otherwise damaging the same.

Another object of the invention is to pulp dry waste paper entirely through the soft, non rigid action of sprays of fluid which disintegrate the paper without cutting, shearing, or tearing the individual fibers therein.

A further object of the invention is to provide a pulper wherein dry waste paper needs no preliminary cooking or wetting, but may be supplied directly to the pulper in dry sheet-like segments and pulped only by pressurized sprays of fluid such as steam, hot water, cold water, or the like.

Still another object of the invention is to provide a new method of pulping dry waste paper which advances a thin layer thereof with both faces substantially exposed, then applies a fluid spray to both faces until the paper is thoroughly wet and then blows the wet paper through screen meshes in usable pulp form.

A still further object of the invention is to provide a waste paper pulper wherein the paper is advanced on an endless meshed conveyor through the middle of a free, substantially unobstructed, space, wetted into pulp consistency by fluid sprays and stripped from the conveyor by being blown therethrough when sufficiently pulped.

Other objects and advantages of the invention will be apparent from the claims, the description of the drawing and from the drawing in which a preferred embodiment thereof is illustrated.

Fig. 1 is a side elevation in section of the spray pulper of this invention.

Fig. 2 is a plan view of the device shown in Fig. 1.

Fig. 3 is an end view in section on line 3—3 of Fig. 1.

Fig. 4 is an end view in section on line 4—4 of Fig. 1.

Fig. 5 is an enlarged fragmentary side elevation of a portion of the foraminous conveyor at the entrance of the pulping zone showing the action of the pressurized fluid sprays on a thin layer of waste paper, and Fig. 6 is a view similar to Fig. 5 of the conveyor near the end of the pulping zone showing the pulp being stripped therefrom by being blown through the apertures of the conveyor.

Fig. 7 is a view similar to Fig. 3 of a modification.

In the drawing, 20 and 21 are bearings for the drums 22 and 23 of a conveyor 24 formed of foraminous material having a plurality of small apertures therethrough. The conveyor 24 is preferably formed of wire screening having a mesh size of about ¼″ x ¼″ and is flexible enough to constitute an endless belt trained around drums 22 and 23. Each drum is mounted on a shaft 25 or 26 journalled in bearings 20 or 21 and one shaft such as 25 carries a pulley 27 connected to any suitable source of power. The horizontal upper stretch 29 of conveyor 24 continuously advances unidirectionally in the direction of the arrows at the rate of about three feet a minute or at a speed necessary to process a desired production and extends from a feed zone 30 through a pulping zone 31. It should be noted that the upper stretch 29 travels through free, substantially unobstructed, space in pulping zone 31 there being no extraneous lateral or longitudinal supports under the upper stretch to interefere with the pulping, screening or pulp collecting operations.

Hopper means 32 is provided in the feed zone 30 and includes the four flared walls 33, 34, 35 and 36 forming a container for receiving dry waste paper. Both the hopper means 32 and the conveyor 24 are approximately eight feet in width and the upper stretch 24 may be ten or fifteen feet in length whereby the pulper has a relatively large capacity. The lower portion of the walls 33, 34, 35 and 36 form an outlet 38 for delivering the material to be pulped onto the conveyor 24. The outlet 38 of hopper means 32 is thus arranged to deliver the material to be pulped in a relatively thin layer onto the upper face 47 of the upper stretch 29 of conveyor 24 in feeding zone 30. The apertures of the foraminous conveyor 24, preferably formed by the open meshes of wire screen, expose substantially all of the lower face of the layer and the upper face of the layer is entirely exposed as the conveyor advances through pulping zone 31.

A flexible wire belt using #8 or #10 wire and having an open area of about a minimum of 20% and not exceeding 50% forms a satisfactory conveyor 24.

It will be understood that the structure of the pulping and stripping means of the invention may be used to spray either hot or cold water, hot steam or any other desired combinations of fluids. A V-shaped spray at a pressure in excess of twenty-five pounds per square inch is preferred with the spray nozzles spaced from the conveyor 24 a distance ranging between two and ten inches. In the particular embodiment of the invention used for illustration herein, the fluid used is hot water and steam but it should be noted that cold water may be used in many applications of the invention.

The principal pulping means 50 of the invention is located at the entrance of pulping zone 31 and comprises a first set of spray pipes 51, 52, 53 and 54 extending transversely across conveyor 24. Spray pipes 51 and 52 are above the conveyor 24 and spray pipes 53 and 54 are oppositely disposed thereto on the under side of the conveyor. Preferably the spray pipes 51, 52, 53 and 54 are in staggered relationship whereby the sprays from one such pipe is directed at the space between the two opposite pipes. The spray pipes 51, 52, 53 and 54 are connected to a supply of hot fluid under pressure whereby the thin layer of paper 55 is thoroughly saturated not only on its upper face 56, but also on its substantially exposed lower face 57. As shown in Fig. 5 the spray pipes 53 and 54 direct hot fluid under pressure through the apertures or meshes of foraminous conveyor 24 to not only agitate the layer but also prevent the components thereof sticking to the conveyor. The opposed, stagger hot fluid sprays also tend to disintegrate the paper sheets in the layer into smaller pieces and separated individual, or groups of, fibers to gradually assume a soft pulpy form.

Preferably the hot fluid in pipe 51 is steam, fed by a connecting pipe 58 from any suitable source such as a steam tank 59. The steam spray from pipe 51 preheats the thin layer 55 and penetrates quickly into and through the same. The spray pipes 52, 53 and 54 are preferably supplied with hot water at a temperature of about 190° F. and the steam and hot water is applied to the layer 55 under super atmospheric pressure in order to agitate the layer and penetrate the components thereof. A connecting pipe 60 feeds pipes 52, 53 and 54 and is supplied from any suitable source such as a hot water tank and pump 61. The thin layer 55 is thus thoroughly wetted in the first few feet of travel on conveyor 24 through pulping zone 31.

A secondary pulping means and stripping means 63 extends along the remainder of pulping zone 31 and comprises a second set of spray pipes such as 64. Each pipe 65 is similar to pipes 52, 53 and 54 and extends transversely above and across conveyor 24 to spray the upper face 56 of the layer 55. Each pipe 65 of the set of pipes 64 is connected to pipe 60 whereby hot water at about 190° F. is supplied thereinto under pressure for pressure spraying the layer 55 in a direction normal to conveyor 24. The hot fluid spray from the set of pipes 64 additionally wets and saturates the components traveling along the pulping zone until such components are sufficiently pulpy and disintegrated from their initial state to be forced through the screen meshes or other apertures of conveyor 24. Thus the layer 55 is continuously being stripped from the conveyor, by passing therethrough and all of the layer 55 has been pulped and stripped at the end of zone 31 proximate drum 23. This action is illustrated in Fig. 6 and constitutes a screening action as well as a pulping and stripping action. Any material incapable of being disintegrated into pulp will continue on the conveyor 24 and may be removed by a scraper blade 67 into a receptacle 68 proximate conveyor 24. Any pulpable material passing through the meshes of conveyor 24 will necessarily be of a predetermined size in accordance with the size of the apertures or meshes.

A collecting trough 70 is positioned under the pulping zone 31 of upper stretch 29 and is at least coextensive with zone 31 in order to receive and collect the pulp forced through the foraminous conveyor 24. Trough 70 is preferably inclined downwardly from one side 71 of the apparatus to the other side 72 thereof, whereby gravity guides the pulp to side 72 where it may be discharged directly into a conventional beater or into any suitable receptacle for refining or the like. End walls 73 and 74 are provided to cover the drums 22 and 23 and prevent pulp from dropping thereon.

The collecting trough illustrated is at an angle of about 15° but as shown in Fig. 7, a trough such as 80 may be at a greater angle such as 25° by lowering the level of the lower stretch 81 of a conveyor 82 with idler rolls such as 83.

I claim:

1. Apparatus for continuously converting dry waste paper and the like into pulp, said apparatus comprising an endless conveyor of foraminous pulp-screening material having a substantially horizontal upper stretch continuously advancing unidirectionally from a feeding zone through a pulping zone with the upper and lower faces thereof exposed and free of extraneous support; feeding means in said feeding zone arranged to receive a supply of waste paper, said feeding means continuously delivering relatively thin sheet-like segments of said paper onto the upper face of said conveyor stretch; a first set of spray pipes, oppositely disposed at spaced distances above and below said upper stretch at the entrance of said pulping zone, said pipes arranged to continuously spray with wet fluid the upper and the lower face of said foraminous conveyor stretch for wetting paper carried thereby, a second set of spray pipes extending along the remainder of said pulping zone at a spaced distance above said upper stretch and arranged to continuously spray with wet fluid the upper face of said foraminous conveyor stretch for wetting said paper and forcing the same in pulp form through the apertures of said stretch; means for continuously supplying said spray pipes with hot wet fluid under super atmospheric pressure and a wet pulp collecting trough, coextensive with said pulping zone and at a spaced distance under said conveyor stretch, for receiving the wet pulp forced through said foraminous material.

2. Apparatus as specified in claim 1 wherein the foraminous material of said endless conveyor is wire screen mesh, having a mesh size of about one quarter inch by one quater inch.

3. Apparatus as specified in claim 1 wherein the opposite pipes of said first set are staggered with relation to each other, and spaced between two and ten inches from the upper stretch of said conveyor to thereby agitate and loosen paper passing thereby on said conveyor.

4. Apparatus as specified in claim 1 wherein at least one pipe of said first set is supplied with steam and the remaining pipes of said set are supplied with hot water.

5. Apparatus as specified in claim 1 wherein said fluid supply means includes means for supplying hot water to said pipes at a temperature of about 190° F.

6. Apparatus as specified in claim 1 wherein said collecting trough is inclined downwardly from one side of said conveyor stretch to the opposite side thereof for delivering said wet pulpy material by gravity to said opposite side.

7. Apparatus for continuously converting dry waste paper and the like into pulp, said apparatus comprising feeding means continuously depositing sheet-like segments of waste paper in a relatively thin layer on conveyor means; conveyor means of screen mesh material continuously advancing said components received from said feeding means into a pulping zone; pulping means, at the entrance of said pulping zone and along said zone with the upper and lower faces of said layer exposed continuously spraying hot wet fluid at high pressure from opposite directions on the waste paper passing thereby on said conveyor means for wetting said paper into pulp form; and pulp stripping means extending along the remainder of said pulping zone, said stripping means continuously spraying hot water at high pressure from one direction only on the waste paper passing thereby on said conveyor means and adapted to force components of said waste paper through the meshes of said conveyor means when in a predetermined pulpy condition.

8. The method of pulping dry waste paper which comprises the steps of conveying a layer of said paper along a path while supporting the same with both opposite faces of the layer substantially exposed; applying fluid at high pressure to both said exposed faces while said layer is advancing along said path, and then applying fluid at high pressure to only one said exposed face while said layer is advancing along said path until said layer is in pulp condition and is blown substantially perpendicularly away from said path.

9. Apparatus as specified in claim 7 plus scraping means engaging said conveyor means at the end of said pulping zone for scraping unpulped material from said conveyor means to clear the meshes thereof.

References Cited in the file of this patent

UNITED STATES PATENTS

| | | |
|---|---|---|
| 2,393,783 | Kridel | Jan. 29, 1946 |
| 2,731,732 | Harris et al. | Jan. 24, 1956 |
| 2,760,410 | Gillès | Aug. 28, 1956 |